United States Patent [19]

Aronstein

[11] Patent Number: 4,589,324

[45] Date of Patent: May 20, 1986

[54] DYNAMIC DISPLAY FOR AUTOMATIC SOUND SIGNAL ANALYZER

[75] Inventor: Jesse Aronstein, Poughkeepsie, N.Y.

[73] Assignee: Wright-Malta Corporation, Ballston Spa, N.Y.

[21] Appl. No.: 604,305

[22] Filed: Apr. 26, 1984

Related U.S. Application Data

[63] Continuation-in-part of Ser. No. 356,501, Mar. 9, 1982, Pat. No. 4,457,203.

[51] Int. Cl.[4] ........................ G10G 7/02; G09B 15/02; G09G 3/18; G02F 1/13

[52] U.S. Cl. .................................... 84/454; 84/477 R

[58] Field of Search ............. 84/453, 454, 462, 477 R, 84/478; 350/334, 335, 336; 340/711, 753, 754, 765, 784

[56] References Cited

U.S. PATENT DOCUMENTS

| | | | |
|---|---|---|---|
| 3,903,519 | 9/1975 | Zega | 350/335 X |
| 4,318,327 | 3/1982 | Toups | 84/477 R |
| 4,434,697 | 3/1984 | Roses | 84/477 R |
| 4,457,203 | 7/1984 | Schoenberg et al. | 84/454 |

*Primary Examiner*—L. T. Hix
*Assistant Examiner*—Douglas S. Lee
*Attorney, Agent, or Firm*—Charles W. Helzer

[57] ABSTRACT

A dynamic display for automatic sound signal analyzing equipment that displays the closest recognized musical note to that being played or sung by a musician, whether the note is sharp or flat or on tune and if sharp or flat, the extent to which it is sharp or flat by means of a strobe-like moving bar pattern.

12 Claims, 11 Drawing Figures

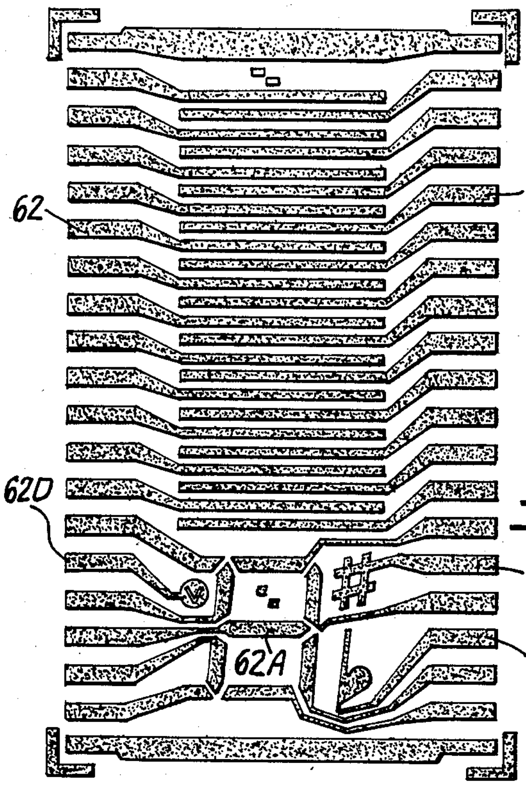
Fig. 4
Fig. 5
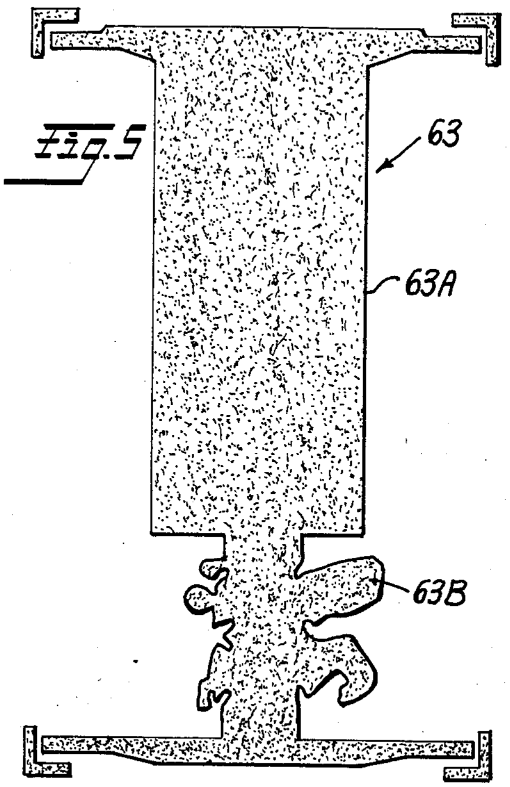
Fig. 6
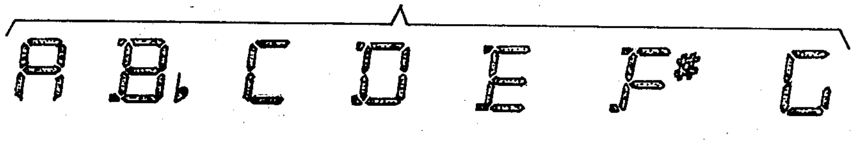
Fig. 7
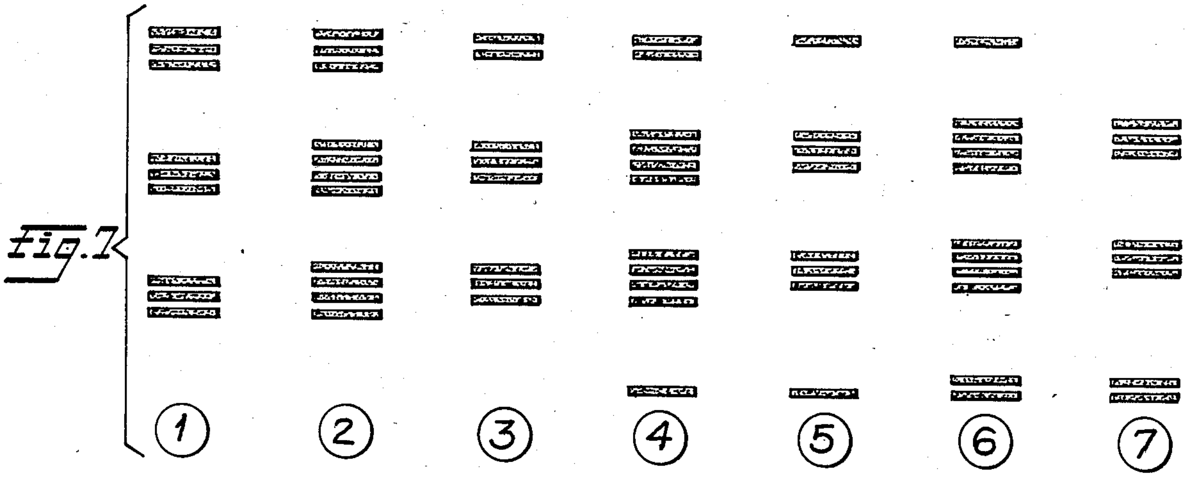
Fig. 8
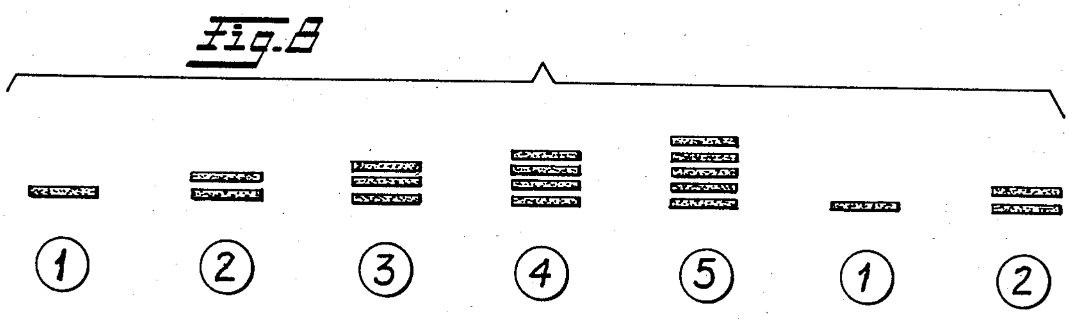

DYNAMIC DISPLAY FOR AUTOMATIC SOUND SIGNAL ANALYZER

This is a continuation-in-part application of U.S. patent application Ser. No. 356,501 filed Mar. 9, 1982,—Jesse Aronstein, et al—inventors for a "Sound Signal Automatic Detection and Display Method and System", now U.S. Pat. No. 4,457,203 issued July 3, 1984.

TECHNICAL FIELD

This invention relates to a novel dynamic display for automatic sound signal analyzing equipment.

More specifically, the invention relates to a novel liquid crystal display for use with an automatically operating sound signal analyzer for detecting the frequency of a sound signal being produced by a musician and thereafter displaying the nature of the sound signal in a manner which is instructive to the musician for improving his or her skills.

BACKGROUND OF INVENTION

The above-noted parent U.S. Pat. No. 4,457,203 of this continuation-in-part application describes and claims a novel sound signal automatic detection and display method and system. The novel dynamic display described and claimed in this continuation-in-part application is particularly well adapted for use in the system described in U.S. Pat. No. 4,457,203 as will become apparent from the following description.

SUMMARY OF INVENTION

It is a primary object of this invention to provide a novel dynamic display for use with automatic sound signal analyzing equipment for displaying the frequency of a sound signal being analyzed in a manner which is instructive to a musician for improving his or her skills.

In practicing the invention, a method and display is provided for displaying the output from a sound signal analyzer. The electrically operated dynamic display is comprised by a plurality of separate, electrically excited character forming electrode members which are shaped in the form of a quasi-universal character capable upon selective electrical excitation of displaying one of the alphabetic characters A, B, C, D, E, F and G and juxtaposed electrode members forming a musical sharp note indicator and a musical flat note indicator. The novel display when properly excited from the output of the sound signal analyzer described in parent U.S. Pat. No. 4,457,203 operates to display the alphabetic character of a musical note whose frequency value is closest to the frequency of the sound signal being analyzed. Under conditions where the sound signal being analyzed is off tune from the displayed musical note, the display concurrently will display whether the signal is sharp or flat.

A further feature of the invention is the provision in an electrically operated, dynamic display having the above-noted characteristics of a plurality of separate electrically excited spaced-apart strobe bar electrode members adjacent to the quasi-universal character forming electrode members and the sharp and flat electrode members. With the display thus constructed, the electrically excited strobe bar electrode members concurrently are energized along with the quasi-universal character forming and sharp and flat electrode members to display a strobe bar pattern that remains steady if the sound signal being anyalyzed is on tune and moves up or down dependent upon whether the sound signal is sharp or flat relative to the displayed closest musical note and the rate of movement of the strobe bar pattern is indicative of the extent that the sound signal is off tune.

Lastly, the novel display and method of operation according to the invention further includes a specialized character electrode member which is additionally excited under conditions where the sound signal analyzer with which the display is being used is being operated in a special variable pitch reference mode of operation as described in the above-noted parent U.S. Pat. No. 4,457,203.

BRIEF DESCRIPTION OF DRAWINGS

These and other objects, features and many of the attendant advantages of this invention will be appreciated more readily as the same becomes better understood from a reading of the following detailed description, when considered in connection with the accompanying drawings, wherein like parts in each of the several figures are identified by the same reference characters, and wherein:

FIG. 4 is a planar view of composite character forming and strobe bar electrode patterns formed on one plate of the display shown in FIGS. 1 and 3;

FIG. 5 is planar view of a common electrode member comprising a part of the display shown in FIGS. 1 and 3;

FIG. 6 constitutes a composite listing of the alphabetic characters and their appearance which can be made with the quasi-universal character forming electrode pattern seen at the bottom of FIG. 4;

FIG. 7 is illustrative of one form of a moving strobe bar display that could be produced with the strobe bar electrode pattern shown in FIG. 4 under certain operating conditions for the display;

FIG. 8 is an alternative form of moving strobe bar display that could be produced by the strobe bar electrode members of FIG. 4 while operating the display; and

PREFERRED MODE OF PRACTICING THE INVENTION

Figure 1:
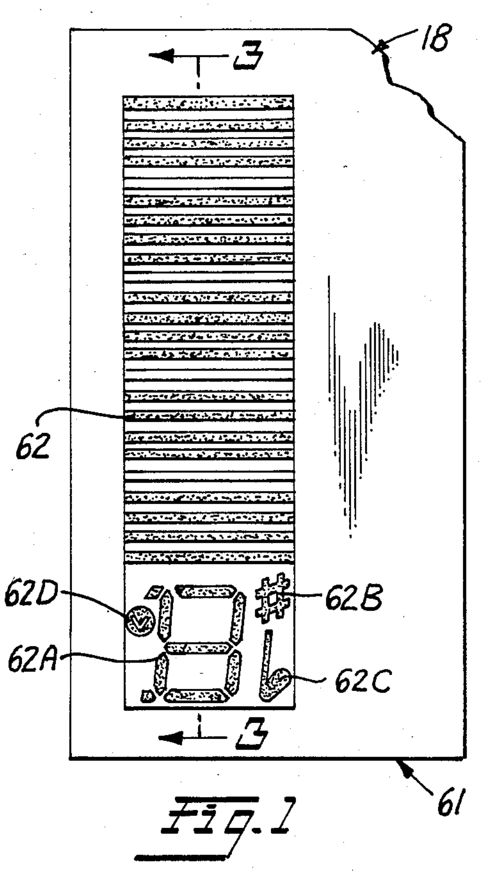
FIG. 1 illustrates the preferred format of the display where used with the sound signal automatic detection and display method and system described in parent U.S. Pat. No. 4,457,203.
Figure 2:
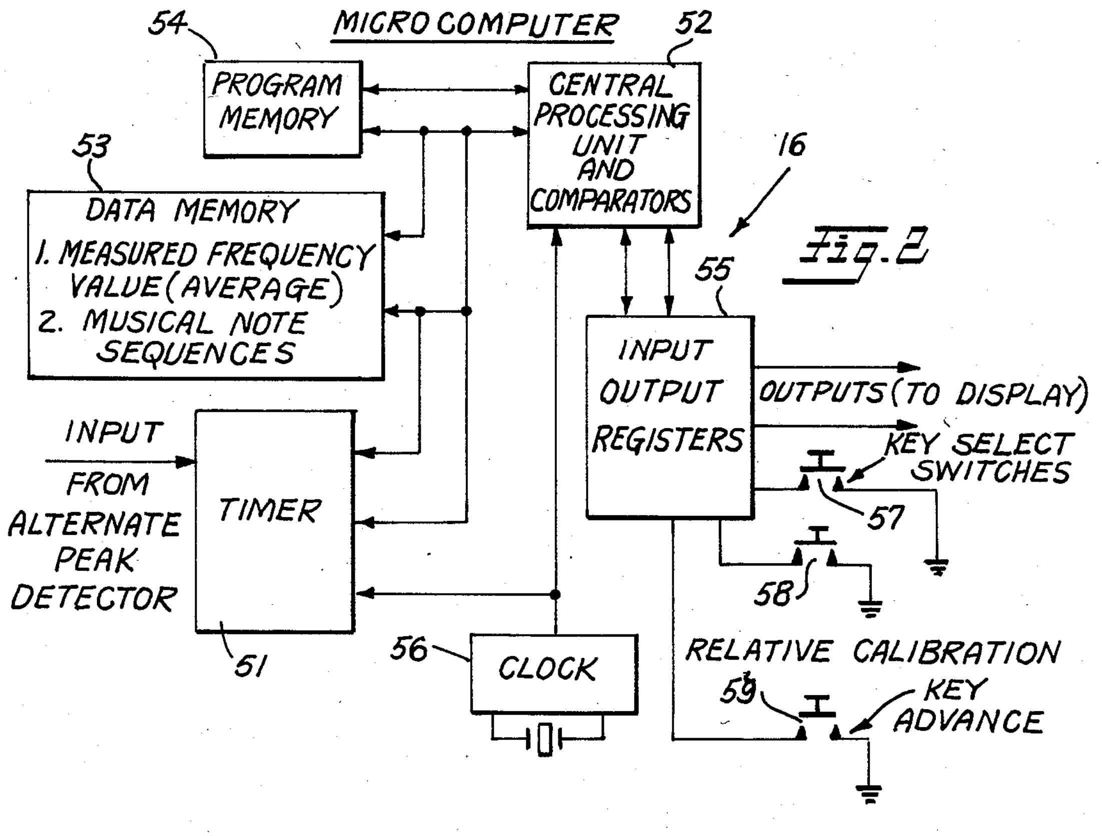
FIG. 2 is a detailed functional block diagram of the essential portions of a microcomputer comprising a part of the sound signal automatic detection and display method and system, and illustrates the manner in which output driving signals are derived for application to the novel dynamic display shown in FIG. 1.

FIG. 1 of the drawings depicts a preferred format for the display which is used by the sound pitch automatic detection system disclosed in parent U.S. Pat. No. 4,457,203 and which is connected to the output of the input-output register of a microcomputer comprising a part of such system. The display shown in FIG. 1 preferably comprises a liquid crystal display, but also could comprise any other known low voltage, relatively low cost display structures such as an electro-luminescent display, light emitting diodes or the like. The display in liquid crystal display format is formed on a base or body member 61 on which is formed a suitable running scale shown at 62. The running scale 62 in fact comprises a series of parallel strobe bar electrode members which form strobe bars that are alternately made visible or invisible to the eye of the viewer depending upon the manner of their excitation by the microcomputer via an input/output register whose output is connected to the parallel bar electrode members as will be described hereinafter with respect to FIG. 4. FIG. 2 illustrates the basic component parts of the microcomputer including an input/output register 55. It will be appreciated therefor, that the output signals from the microcomputer determine the visual effect achieved with the display 61.

If the actual measured frequency value of a musical note being analyzed by the sound signal analyzing system of parent U.S. Pat. No. 4,457,203, is off tune, then there will be relative visible movement of the strobe bars along the length of the panel 61 either up or down. The greater the difference between the true note and the actual measured frequency value of the note being played, the faster the relative movement of the strobe bars will appear.

The direction of movement either up or down will indicate whether the actual measured frequency value of the musical note being analyzed is above the true note or below the true note. This easily seen running pattern of relatively moving strobe bars will be of considerable assistance to a practicing musician since he can readily see, without having to touch or adjust the display, how close to the true frequency value of a given musical note his own efforts to reproduce the note are coming. He accordingly, can then adjust his technique to achieve a closer reproduction of the desired note's frequency value.

In addition to the moving strobe bars 62, the display 61 further includes the capability of reproducing a set of characters such as B shown at 62A in FIG. 1 which indicates the nearest musical note to that which is being analyzed and further includes either a sharp sign 62B of a flat sign 62C which will appear to the right of the note identification letter 62A if the note actually being played is indeed sharp or flat. A further feature of the display is to indicate whether or not the variable pitch reference mode of operation is being employed by the user of the automatic sound analyzing system and this will appear as a small letter v shown at 62D to the left of the note identification character 62A in FIG. 1. This variable pitch reference character will appear under those circumstances where the user has actuated a relative calibration switch 58 shown in the functional block diagram of FIG. 2, and indicates that the entire scale of correct frequencies has been shifted so as to agree with the note being played at the point in time when the switch 58 was activated.

FIG. 2 is a functional block diagram of the essential parts of a suitable microcomputer for the sound analyzing system shown and described with relation to FIG. 1 of the above-referenced parent U.S. Pat. No. 4,457,203. For a more detailed description and operation of the sound signal analyzer up to the point of the application of its output signal to the microcomputer shown in FIG. 2, reference is made to parent U.S. Pat. No. 4,457,203, the disclosure of which is hereby incorporated into this application in its entirety. The microcomputer shown in FIG. 2 is comprised by a timer circuit 51 to which an output square wave signal derived from prior signal processing portions of the overall sound signal analyzing system of U.S. Pat. No. 4,457,203 is supplied. The timer circuit 51 functions to measure the time required for an even, integral number of cycles of a square wave signal supplied from an alternate peak detector in a prior part of the analyzer equipment, to occur. The number of cycles and the time required then is supplied to a central processing unit 52 that serves to calculate the frequency of the sound wave being analyzed in accordance with the classical formula $f=1/T$. This is achieved by dividing the number of integral cycles counted by timer 51 by the measured interval of time required for the number of cycles to occur. The resultant value is the measured frequency value of the input wave being analyzed and is stored in a data memory bank shown at 53. A program stored in a program memory shown at 54 preferably programs the microcomputer to perform this calculation a number of times in order to obtain several frequency readings (for example 3) which then must fall within certain tolerances. This can be determined by storing the resultant value from each calculation in a working memory (part of the central processing unit) and comparing all of the values with a comparator also comprising a part of the central processing unit 52. Upon the occurance of say three corresponding readings, the microprocessor can be programmed to trigger the display and store one of the resultant measured values, or an average measured value, in the working memory of the central processing unit 52. The resultant measured value also is supplied to input/output registers 55 for exciting appropriate segments of the display 61.

By storing appropriate programs in the program memory 54, and the addition of an operator controlled key select switch 57 as well as a relative calibration switch 58, additional functions can be formed with the data stored in the data memory 53. For example, the corresponding frequencies of recognized musical notes comprising a musical scale can be stored in the data memory 53.

Key select switch 57 is used to identify to the microcomputer the key in which an instrument is being played. Once set, the key select is not changed during normal operation of the system. It is set once each time the system is turned to the appropriate key for the musical instrument to be tuned. This is necessary because different musical instruments assign different names (notes) to the same frequency. This is specified for each instrument by the name of the note on the concert scale which is produced by that instrument when a "C" is played on the instrument. Many instruments, such as the piano, violin and guitar produce a concert C when a C is played, hence these instruments play in the "key of C". Other instruments, such as the clarinet and the French horn, do not produce a concert C when playing a C. The most common clarinet produces a concert B♭ (it is called a B♭ clarinet), while a French horn produces a concert F. Since the sound analyzing system of parent U.S. Pat. No. 4,457,203 assumes a concert C scale, it would identify a C played on the clarinet as a B♭, which is correct but may be confusing to the user. The following table shows the relations of the different scales.

| | | | | | | | | | | | | | |
|---|---|---|---|---|---|---|---|---|---|---|---|---|---|
| Concert Scale | C | C# | D | E♭ | E | F | F# | G | G# | A | B♭ | B | C |
| Piano Scale | C | C# | D | E♭ | E | F | F# | G | G# | A | B♭ | B | C |
| B♭ Clarinet | D | E♭ | E | F | F# | G | G# | A | B♭ | B | C | C# | D |
| French Horn | G | G# | A | B♭ | B | C | C# | D | E♭ | E | F | F# | G |

By identifying to the microcomputer via key select switch 57 in advance (used only once for practice session) the key of the instrument to be played, it can correct the display to give appropriate indications to the user. Thus, a clarinetist would set the key to B♭ so that the system would work correctly with his instrument.

Upon the relative calibration switch 58 being closed, the input frequency of a note being played into the microphone of the sound analyzing system can be stored in the data memory in which the correct frequency of the note being played already has been stored. The program memory 54 is programmed to cause the central processing unit 52 to divide the correct frequency for the nearest note to that being played by the measured frequency value of the note being played with the quotient then being stored in the data memory as a relative calibration factor. Thereafter, with the system operating in this mode, all future notes being played are multiplied by the calibration factor as a means for calibrating the response of the system to the notes being played by a particular musical instrument. For example, the correct frequency value for middle C in the diatonic scale is 256 hertz. If, for example, the measured frequency value for middle C being played by a particular instrument turns out to be 254 hertz, the relative calibration factor is obtained by dividing 256 by 254 and thereafter all succeeding notes played by that particular instrument can be corrected through the use of the relative calibration factor in order to obtain a reading of the relative character of the musical notes being played by that instrument (or instrumentalist).

In addition to the above-described features, the microprocessor includes a key advance switch 59 which can be depressed in conjunction with a key select switch 57 to cause the program memory 54 automatically to advance the key selected one-half tone for each actuation of the key advance switch.

Figure 3:
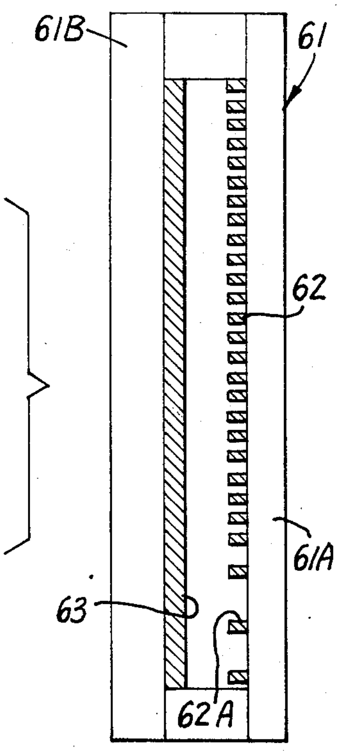
FIG. 3 is a longitudinal sectional view of the novel display taken through plane 3—3 of FIG. 1.

FIG. 3 is a longitudinal sectional view of the novel display taken through plane 3—3 of FIG. 1. As shown in FIG. 3, the display housing 61 comprises a liquid tight housing fabricated from opposed insulating backing members 61A and 61B. The insulating backing member 61A has formed thereon the strobe bar electrode members 62 and the universal character forming electrode members 62A as well as the sharp and flat characters and the small v which when acutated indicates operation in the variable pitch reference mode. The oppositely disposed insulating backing member 61B of the housing has a common electrode 63 formed thereon. All of the electrode members 6, 62A, 62B 62C, 62D and the common electrode member 63 preferably comprise electrically conductive, transparent films which are electro-deposited or otherwise formed on the opposing surfaces of respective insulating backing members 61A and 61B in opposed, spaced-apart relationship as shown in FIG. 3. The space between the opposed electrode members is then filled with a suitable liquid crystal material commercially known in the art which when properly excited will cause the display to work as described hereinafter with relation to FIG. 9 of the drawings.

FIG. 4 is a planar view of the character forming and strobe bar electrode patterns formed in the above-described manner on the insulating backing member 61A of the display housing. In FIG. 4, the strobe bar electrode members together with their input terminal pads are shown at 62. Just below the strobe bar electrode members 62 is located the quasi-universal character forming electrode members 62A which can be seen to be comprised of separate, electrically excited components each of which has its own input terminal pad and which are electrically insulated one from the other. By selective simultaneous electrical excitation of desired ones of the separately excited components by appropriate signals supplied from the microcomputer via input/output register 55 of FIG. 2 to the input terminal pads, display of a desired one of the alphabetic character A, B, C, D, E, F or G as shown in FIG. 6 can be produced. These characters can be displayed each by itself or in juxtaposition to a musical sharp indicator or a musical flat indicator whose electrode members and input terminal pads are shown at 62B and 62C, respectively. Further, if the sound signal analyzer with which the display is being used is being operated in a special variable pitch reference mode, indication of this fact is provided by the microcomputer via input and output register 55 to the input terminal pad of the v indicator electrode member 62D.

FIG. 5 is a planar view of the common or back electrode member 63 shown in FIG. 3. That portion of the common electrode member 63 which is disposed opposite the array of strobe bar electrode members 62 comprises essentially a flat rectangular planar area. However, that portion of the common electrode member 63 which is disposed opposite the quasi-universal character forming electrode members 62A, the sharp and flat character forming members 62B and 62C and the variable pitch reference mode indicator 62D has the shape shown at 63B in FIG. 5 in order to minimize to the greatest extent possible stray coupling so as to enhance the display quality.

Figure 9:
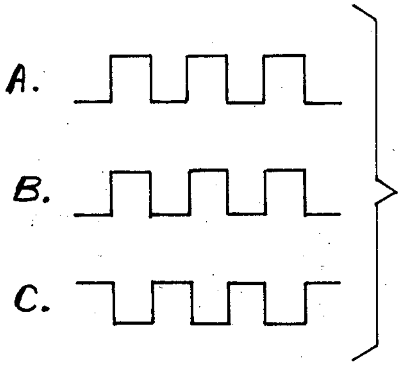
FIGS. 9A, 9B and 9C illustrate the nature of the electrical excitation signals which are applied to the figure forming and strobe bar electrode members of the display and the common electrode member, respectively.

FIG. 9 illustrates the nature of the electrical signals provided to the various electrode members via their input terminal pads from input/output register 55 and the central processing unit 52 shown in FIG. 2. In operation, the common electrode member 63 is energized with an electrical signal having the waveshape shown in FIG. 9A. When any opposing electrode member is energized with a signal as shown in FIG. 9B which is in phase with the excitation signal supplied to the common electrode member 63, the liquid crystal material in the space between the two opposed transparent electrode members remains transparent. Hence, no display would be observed by a viewer. However, upon application of an out-of-phase signal as shown in FIG. 9C selectively to components of anyone of the electrode members 62, 62A, 62B, 62C or 62D by the microcomputer via input/output registers 55, results in light scattering by the liquid crystal material in the space between the two spaced-apart electrode members so that with respect to these electrode members the respective spaces appear to the eye to be black. As a consequence by appropriate simultaneous excitation of selected segments of the quasi-universal character forming electrode member 62A, all of the characters shown in FIG. 6 with or without the adjacent sharp and flat indicators 62B and 62C can be visibly displayed.

FIG. 7 illustrates a preferred manner of operating the strobe bar pattern 62 which can be readily viewed by a musician or other user of the sound analyzing equipment to determine how far off a given frequency the sound signal he or she is playing lies. It should be understood, however, that the particular pattern indicated in FIG. 7 is only exemplary and can be varied in a number of different ways by appropriate programming of the microcomputer to provide any desired pattern of movement for the strobe bars. FIG. 7 depicts a strobe bar pattern which sequentially in time appears to the eye of the observer to be moving upwardly while viewed from left to right in steps 1 through 7. The fact that the bar pattern is climbing upwardly is indicative to the observer that the note being played is sharp and the rate of the upward movement of the bars is proportional to the amount that the note is off tune. If the bar pattern stands still, the note being played is on tune. If however the bar pattern appears to descend while viewed in time sequence, it is indicative that the note being played is flat and again the rate at which the bar pattern appears to descend is proportional to the amount that the note is off tune.

Alternate forms for strobe bar pattern movement can be employed which are different from that illustrated in FIG. 7. FIG. 8 is illustrative of just one different mode or manner of operating the strobe bar pattern to achieve the same effect. In FIG. 8, the bar patterns again are illustrated in time sequential manner reading from left to right through steps 1 through 5 and then repeated. Here again, if a note being played is sharp, the bar pattern will appear to be climbing in steps 1 through 5 and the rate at which it climbs is proportional to the amount that the note is off tune. Conversely, if the note if flat the bar pattern will appear to descend in moving from 1 to 5 in time sequence and again the rate of movement of the descending bar pattern is proportional to the amount that the note is off tune. Other variations of the manner of driving the strobe bar pattern are of course possible. If the bar pattern stands still the note being played is on tune.

Industrial Applicability

The invention makes available a novel dynamic display suitable for automatic sound/pitch analyzing equipment to be used by students and teachers of music in displaying the nature of sound signals being produced by the musicians or the students to assist them in improving their skills.

Having described one embodiment of a novel dynamic display for automatic sound signal analyzing equipment constructed in accordance with the invention, it is believed obvious that other modifications and variations of the display will be suggested to those skilled in the art in the light of the above teachings. It is therefore to be understood that changes may be made in the particular embodiment of the invention described which are within the full intended scope of the invention as defined by the appended claims.

What is claimed is:

1. A dynamic display for a sound signal analyzer comprising a housing having a plurality of separate electrically excited character forming electrode members electrically insulated from each other; said character forming electrode members being in the form of a quasi-universal character capable upon selective electrical excitation of displaying one of the alphabetic characters A, B, C, D, E, F and G, an electrode member forming a musical sharp note indicator ♯, an electrode member forming a musical flat note indicator ♭ in juxtaposition to said quasi-universal character electrode members for display in conjunction with said alphabetic characters under certain conditions and a plurality of spaced-apart strobe bar electrode members adjacent to the quasi-universal character forming and the sharp and flat electrode members.

2. A dynamic display according to claim 1 wherein the quasi-universal character forming members are comprised of separate electrically excited components each of which has its own input terminal which are electrically insulated one from the other whereby selective excitation of the separately excited components causes display of a desired one of the alphabetic characters A, B, C, D, E, F, or G by itself or in juxtaposition to a musical sharp indicator ♯ or a flat indicator ♭, each of which also has its own input terminal and is selectively separately excited under certain operating conditions, and wherein the spaced-apart strobe bar electrode members likewise each have their own input terminals and are selectively separately excited whereby the nature of a sound signal being analyzed can be displayed by the character symbol indicative of the closest note to the sound being analyzed, and whether the note is sharp ♯ or flat ♭ in conjunction with a moving or stationery bar graph which is indicative of whether the note is on tune, sharp or flat and by means of the direction of movement of the moving bar graph whether the note is above or below a desired note and by the rate of movement of the bar graph how far above or below a desired note the actual sound being analyzed happens to be.

3. A dynamic display according to claim 1 further including an additional specialized character electrode member adjacent the quasi-universal character forming and sharp and flat electrode members, said specialized character electrode member upon selective excitation via its own input terminal serving to indicate that the sound signal analyzer with which the display is being used is operating in a special variable pitch reference mode of operation.

4. A dynamic display according to claim 2 further including an additional specialized character electrode member adjacent the quasi-universal character forming and sharp and flat electrode members, said specialized character electrode member upon selective excitation via its own input terminal serving to indicate that the sound signal analyzer with which the display is being used is operating in a special variable pitch reference mode of operation.

5. A dynamic liquid crystal display for a sound signal analyzer comprising a housing having supported therein an electrically conductive common electrode member, a plurality of separately excited character forming electrode members in spaced-apart parallel confronting relationship with respect to and electrically insulated from said common electrode member, liquid crystal material filling the space intermediate the common electrode member and the character forming electrode members, the character forming electrode members being shaped in the form of a quasi-universal character capable upon selective electrical excitation of displaying one of the alphabetic chracters A, B, C, D, E, F and G by itself or in juxtaposition to an electrode member forming a musical sharp note indicator # or an electrode member forming a musical flat note indication ♭ and a plurality of spaced-apart bar electrode members adjacent to the quasi-universal character forming and sharp and flat indicator electrode members on the same side of the liquid-tight housing therewith and in spaced-apart parallel confronting relationship to said common electrode member.

6. A liquid crystal display according to claim 5 wherein the quasi-universal character members are comprised of separate electrically excited components each of which has its own input terminal and which are electrically insulated one from the other whereby selective excitation of the separately excited components causes display of a desired one of the alphabetic characters A, B, C, D, E, F or G by itself or in juxtaposition to the musical sharp indicator # or flat indicator ♭, each of which also has its own input terminal and is selectively separately excited under certain operating conditions; and wherein the spaced-apart bar electrode members likewise each have their own input terminals and are selectively separately excited whereby the nature of a sound signal being analyzed can be displayed by the character symbol indicative of the closest note to the sound being analyzed, and whether the note is sharp # or flat ♭ in conjunction with a moving or stationery bar graph which is indicative of whether the note is on tune, sharp or flat and by means of the direction of movement of the moving bar graph whether the note is above or below a desired note and by the rate of movement of the bar graph how far above or below a desired note the actual sound being analyzed happens to be.

7. A liquid crystal display according to claim 5 further including an additional specialized character electrode member adjacent the quasi-universal character forming electrode members on the same side of the liquid-tight housing therewith and in spaced-apart parallel confronting relationship to said common electrode member, said specialized character electrode member upon selective excitation via its own input terminal serving to indicate that the sound signal analyzer with which the display is being used is operating in a special variable pitch reference mode of operation.

8. A liquid crystal display according to claim 6 further including an additional specialized character electrode member adjacent the quasi-universal character forming electrode members on the same side of the liquid-tight housing therewith and in spaced-apart parallel confronting relationship to said common electrode member, said specialized character electrode member upon selective excitation via its own input terminal serving to indicate that the sound signal analyzer with which the display is being used is operating in a special variable pitch reference mode of operation.

9. A dynamic liquid crystal display according to claim 5 wherein the electrically conductive common electrode member is specially shaped so that it provides a common confronting surface opposite substantially only the specially-shaped quasi-universal character forming electrode members, the sharp and flat note indicators and the spaced-apart bar electrode members.

10. A dynamic liquid crystal display according to claim 8 wherein the electrically conductive common electrode member is specially shaped so that it provides a common confronting surface opposite substantially only the specially-shaped quasi-universal character forming electrode members and the sharp and flat note indicators and the additional specialized character electrode member.

11. The method of displaying the output from a sound signal analyzer employing an electrically operated dynamic display comprised by a plurality of separate electrically excited character forming electrode members which are shaped in the form of a quasi-universal character capable upon selective electrical excitation of displaying one of the alphabetic characters A, B, C, D, E, F and G and juxtaposed to electrode members forming a musical sharp note indicator and musical flat note indicator; and an electrically operated dynamic display which further includes a plurality of separate electrically excited spaced-apart strobe bar electrode members adjacent to the quasi-universal character forming electrode members and sharp and flat electrode members; said method comprising displaying the alphabetic character of a musical note whose frequency value is closest to the frequency of a sound signal being analyzed and under conditions where the sound signal being analyzed is off tune from the displayed musical note concurrently displaying whether the signal is sharp or flat and electrically exciting the strobe bar electrode members concurrently with the quasi-universal character and the sharp and flat electrode members to display a strobe bar pattern that remains steady if the sound signal being analyzed is on tune and moves up or down dependent upon whether the sound signal is sharp or flat relative to the displayed closest musical note and the rate of movement of the strobe bar pattern is indicative of the extent that the sound signal is off tune.

12. The method according to claim 11 using an electrically operated dynamic display which further includes a specialized character electrode member; said method further including additionally exciting the specialized character electrode member to additionally display that the sound signal analyzer with which the display is being used is operating in a special variable pitch reference mode of operation.

* * * * *